Dec. 4, 1945.  E. W. DETJEN  2,390,355
WATER MOTOR FOR LAWN SPRINKLERS, ETC
Filed Oct. 9, 1944 2 Sheets-Sheet 1
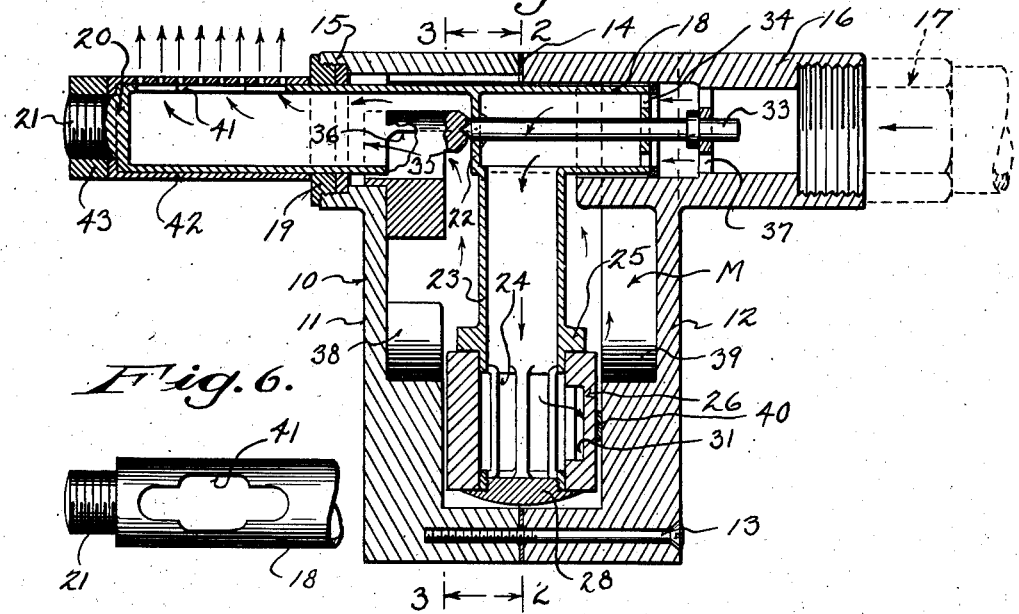
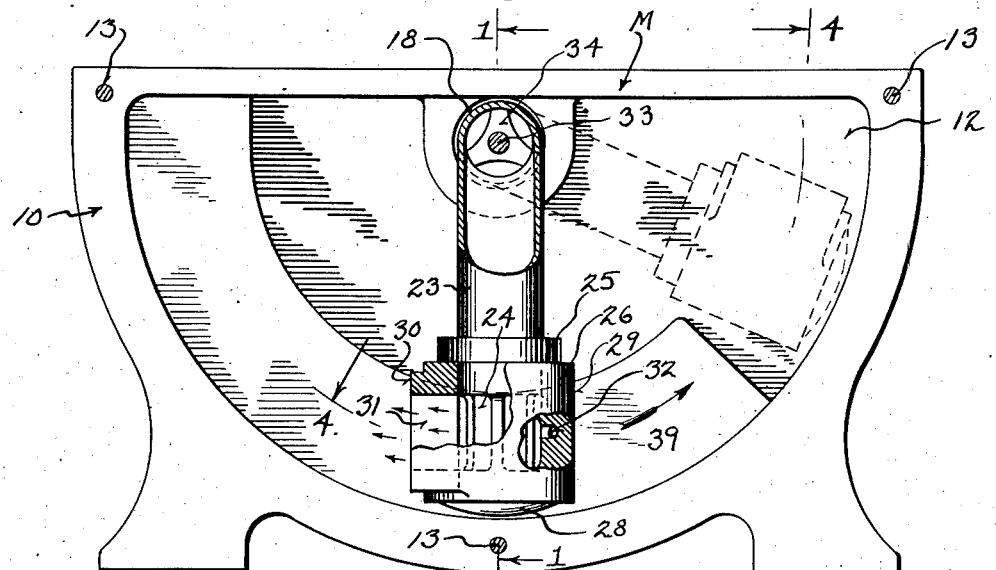
INVENTOR
EDGAR W. DETJEN
BY
ATTORNEYS Dec. 4, 1945.  E. W. DETJEN  2,390,355
WATER MOTOR FOR LAWN SPRINKLERS, ETC
Filed Oct. 9, 1944   2 Sheets-Sheet 2
*Fig. 3.*
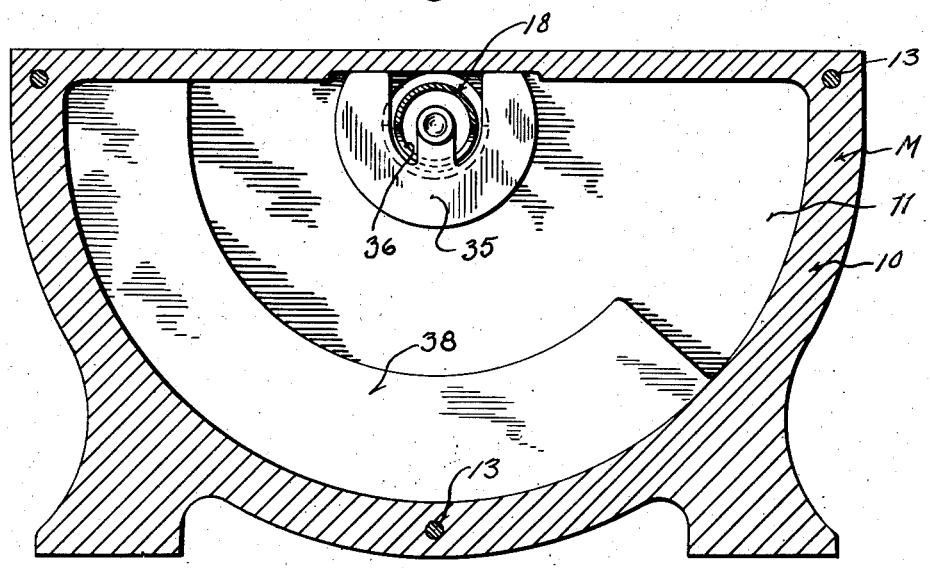
*Fig. 4.*
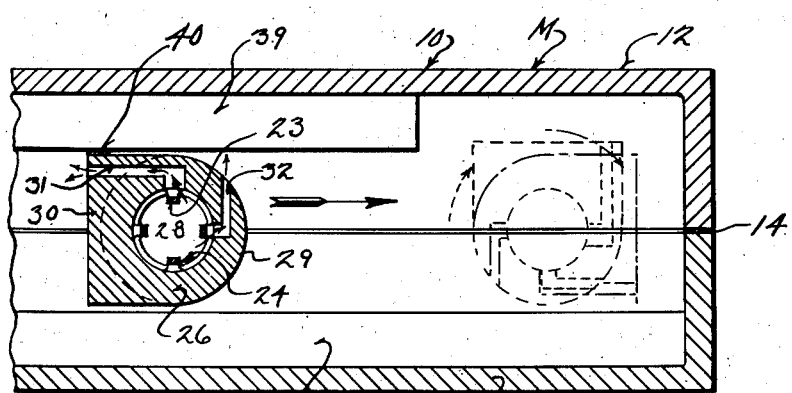
*Fig. 5.*
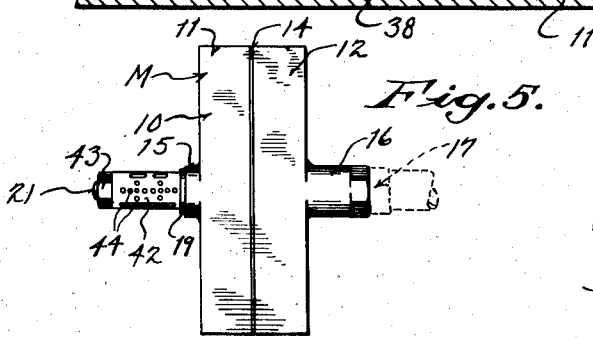
INVENTOR
EDGAR W. DETJEN
ATTORNEYS Patented Dec. 4, 1945

2,390,355

UNITED STATES PATENT OFFICE 2,390,355

WATER MOTOR FOR LAWN SPRINKLERS, ETC.

Edgar W. Detjen, Milwaukee, Wis.

Application October 9, 1944, Serial No. 557,833

4 Claims. (Cl. 253—17)

This invention appertains to hydraulics, and more particularly to an oscillating motor driven by a fluid, such as water under pressure.

One of the primary objects of my invention is to provide a small compact powerful water motor, which is particularly useful for oscillating the spray head of a lawn sprinkler, whereby a lawn can be watered in an advantageous manner.

Another salient object of my invention is to provide a water operated motor embodying an oscillating hollow shaft carrying a depending hollow arm through which the water under pressure is conducted to a reversing head having an outlet for a driving jet and an outlet for a jet for turning the head at the end of a driving stroke or cycle to reverse the direction of travel of the shaft, the head being normally held against turning movement by novelly arranged guide tracks.

A further important object of my invention is to provide a novel spray head carried by the hollow shaft which can be turned about the axis of the shaft to a desired adjusted position for varying the character of the spray or water stream delivered to the lawn being sprinkled.

A still further important object of my invention is to provide an oscillating water motor which will be durable and efficient in use, one that will be simple and easy to manufacture and one which can be placed upon the market at a reasonable cost.

With these and other objects in view the invention consists in the novel construction, arrangement and formation of parts, as will be hereinafter more specifically described, claimed, and illustrated in the accompanying drawings, in which drawings:

Figure 1 is a longitudinal sectional view through my water motor showing the same in its preferred form for use as a lawn sprinkler, the section being taken on the line 1—1 of Figure 2, looking in the direction of the arrows.

Figure 2 is a transverse sectional view through the motor taken on the line 2—2 of Figure 1 looking in the direction of the arrows.

Figure 3 is a view similar to Figure 2 but taken on the line 3—3 of Figure 1 looking in the direction of the arrows.

Figure 4 is a detailed sectional view taken on the line 4—4 of Figure 2 looking in the direction of the arrows illustrating the novel reversing head.

Figure 5 is a top plan view of the complete water motor in its form as a lawn sprinkler, the view being on a smaller scale than Figures 1 to 4, inclusive.

Figure 6 is a fragmentary top plan view of the front end of the hollow shaft with the sprinkling head removed to illustrate the water outlet opening therein.

Figure 7 is a plan view of the sprinkler head per se.

Figure 8 is a transverse sectional view through the sprinkler head taken on the line 8—8 of Figure 7 looking in the direction of the arrows.

Referring to the drawings in detail, wherein similar reference characters designate corresponding parts throughout the several views the letter M generally indicates my novel water motor. While the motor is capable of various uses, such as oscillating the head of a washing machine, I have shown the motor in the drawings in its preferred use for functioning as a lawn sprinkler. The motor M includes a hollow casing 10 formed from companion sections 11 and 12. These sections can be firmly united by means of bolts 13. To provide a watertight construction, a gasket 14 can be placed between said sections 11 and 12. The forward section 11 has formed thereon at its upper central portion a forwardly projecting nipple 15, the purpose of which will be later set forth. The rear section 12 has formed thereon in axial alinement with the nipple a water inlet coupling 16 for receiving a hose connection 17. This is utilized to supply water under pressure to the casing.

Mounted for oscillating movement within the casing is a hollow shaft 18 and this shaft extends forwardly through the nipple 15. A packing nut or gland 19 is carried by the nipple and surrounds the shaft so as to make a watertight connection. The forward end of the shaft is closed by an end wall 20 and this wall can carry a threaded stud 21, the purpose of which will also later appear. The hollow oscillating shaft 18 is provided intermediate its ends with a partition wall 22 and the hollow shaft has communicating therewith inward of said partition wall a depending hollow arm 23. This arm extends toward the bottom of the casing and is located equidistantly between the front and rear walls of the casing. The lower end of the hollow arm is provided with a series of water outlets 24 and a stop shoulder 25 is carried by the arm directly above said water outlets. Mounted upon the hollow arm and against said stop shoulder for turning movement is a reversing head 26. This head surrounds and encompasses the water outlets 24 and the head is held on said arm by a nut 28 which closes the lower end of said arm.

The reversing head 26 is provided with a curved leading surface 29 and a flat following face 30. Opening out through said face at one side thereof is a water channel 31. This channel communicates with the interior of the head so that water flowing through the openings 24 will enter said channel to form a driving jet as will be also later set forth. Opening out through one side of the curved leading face 29 is a channel 32 and the inner end of this channel also communicates with the interior of the head so as to allow the free flow of water from the arm into said channel to form a reversing jet.

In order to rockably support the hollow shaft an axial spindle 33 is carried by the hollow shaft 18 and this spindle is firmly anchored as by welding to the partition wall 22 and to a spider 34 anchored in said hollow shaft. The forward end of the spindle is provided with a pointed bearing terminal which is detachably seated within a bearing block 35 fastened to the front wall of the casing. The upper end of this block projects into the hollow shaft through an arcuate opening 36 formed in said shaft. This opening 36 allows the flow of water into the hollow shaft ahead of the partition wall 22 and also functions as means for permitting the accurate placing of the bearing block. Actually the side walls of the opening 36 form stops for engaging the opposite sides of the bearing extension of the block to limit the oscillating movement of the shaft. The coupling 16 has mounted therein a bearing spider 37 for the rear end of the spindle 33. Hence, by this construction the shaft and its depending arm is free to rock in said casing.

In order to prevent the turning of the reversing head 26 during the working stroke of the arm 23 the front wall of the casing section 11 has secured thereto or formed thereon an arcuate guide track 38. This guide track terminates short of one side of the casing. A similar guide track 39 is secured to or formed on the rear wall of the casing section 12 and this track terminates short of the opposite side of the casing from the track 38.

In operation of my motor, water under pressure enters the hollow shaft through the coupling 16 from a supply hose and the water travels to the reversing head through the depending arm 23. This water under pressure flows in a stream out of the channel 31 and forms a driving jet for swinging said arm and shaft in one direction. Also flowing through said head through the channel 32 is a stream of water which functions as a reversing jet. By referring to Figures 2 and 4 of the drawings, it can be seen that the swinging arm is being moved in a counter-clockwise direction by the driving jet and that the reversing jet normally tends to swing the reversing head on the arm but that turning movement of the head is prevented by the track 39. When the arm reaches the right-hand side of the casing the head will ride off of the track 39 and the jet being emitted from the channel 32 will swing said head on the arm (see the dotted line shown in Figure 4) and the position of the head will be reversed. The driving jet from channel 31 will now drive the head to the left and when the head reaches the end of track 38 the reversing jet will again turn the head and the arm will again be driven to the right.

Antifriction wear pad 40 is carried by one side of the head for engaging first one track and then the other. By referring to Figure 1, it can be seen that the tracks 38 and 39 form a guideway in between, in which the head travels.

To permit the motor to function as a lawn sprinkler the forward end of the hollow shaft is provided with a water outlet opening 41 of substantially cruciform shape and mounted upon the forward end of the shaft to cover said opening 41 is a spray head 42. This spray head 42 is in the nature of a sleeve and is held in an adjusted position on said shaft by a nut 43 which is threaded on the stem or stud 21. At equidistantly spaced points around the spray head 42 are water outlet openings 44 of different characters and by loosening the nut 43 the spray head can be turned on the shaft to bring a desired set of spray openings in alinement with the water outlet 41.

The water fills the casing and flows into the forward end of the shaft through the opening 36 and is then forced out of the spray head. Obviously during the oscillation of the shaft the water from the spray head is thrown first on one side of the casing and then on the other. In this way a desired area of lawn can be effectively sprinkled.

Changes in details may be made without departing from the spirit or the scope of this invention, but what I claim as new is:

1. A water motor comprising a casing having a water inlet, a hollow shaft rockably mounted in said casing for receiving the water from the inlet, a depending hollow arm carried by the shaft and communicating with the interior thereof and having water outlets, a driving and reversing head rotatably mounted upon said arm and enclosing said outlets, said head having a drive jet and a reversing jet and means in said casing for preventing turning movement of the head under influence of the driving jet during the working stroke of the arm and means for permitting turning of the head on the arm under influence of the reversing jet at the ends of the working stroke.

2. An oscillating water motor having a water inlet, a hollow rock shaft mounted in said casing for receiving water from the inlet, a depending hollow arm carried by the shaft and communicating with the interior thereof, means including an oscillating head on said arm having water jet for driving the arm in one direction and means for reversing the position of the head and the jet on the arm when the arm reaches the end of a power stroke for driving the arm in the opposite direction.

3. An oscillating water motor comprising a casing having a water inlet, a hollow shaft rockably mounted in said casing communicating with the inlet, a depending hollow arm carried by the shaft and communicating with the interior thereof for receiving water therefrom, the lower end of said arm being provided with water outlets around its entire periphery, a driving and reversing head mounted for turning movement upon the lower end of said arm encompassing said outlets, said head having a leading face and a following face and a water channel communicating with the interior thereof and opening out through the follower face, whereby water flowing through said channel will function as a drive jet to move said arm in one direction, said head also having a water outlet channel at one side of the leading face, whereby water emitted from said last mentioned channel functions as a jet to normally turn the head on said arm and means for preventing turning movement of the head on the arm during the working stroke of the arm.

4. An oscillating water motor comprising a casing having a water inlet, a hollow shaft rockably mounted in said casing communicating with the inlet, a depending hollow arm carried by the shaft and communicating with the interior thereof for receiving water therefrom, the lower end of said arm being provided with water outlets around its entire periphery, a driving and reversing head mounted for turning movement upon the lower end of said arm encompassing said outlets, said head having a leading face and a following face and a water channel communicating with the interior thereof and opening out through the follower face, whereby water flowing through said channel will function as a drive jet to move said arm in one direction, said head also having a water outlet channel at one side of the leading face, whereby water emitted from said last mentioned channel functions as a jet to normally turn the head on said arm, and guide tracks in said casing on opposite sides of said head normally preventing turning movement of said head, one of said tracks terminating short of one end of the casing and the other of said guide tracks terminating short of the other end of said casing.

EDGAR W. DETJEN.